F. O. KRUEGER.
MILK BOTTLE CABINET.
APPLICATION FILED JAN. 2, 1917.

1,257,495.

Patented Feb. 26, 1918.
4 SHEETS—SHEET 1.

F. O. KRUEGER.
MILK BOTTLE CABINET.
APPLICATION FILED JAN. 2, 1917.

1,257,495.

Patented Feb. 26, 1918.
4 SHEETS—SHEET 2.

WITNESS
H. G. Barrett

INVENTOR.
Frank O. Krueger
BY Jones, Addington, Ames and Seibold
ATTORNEYS.

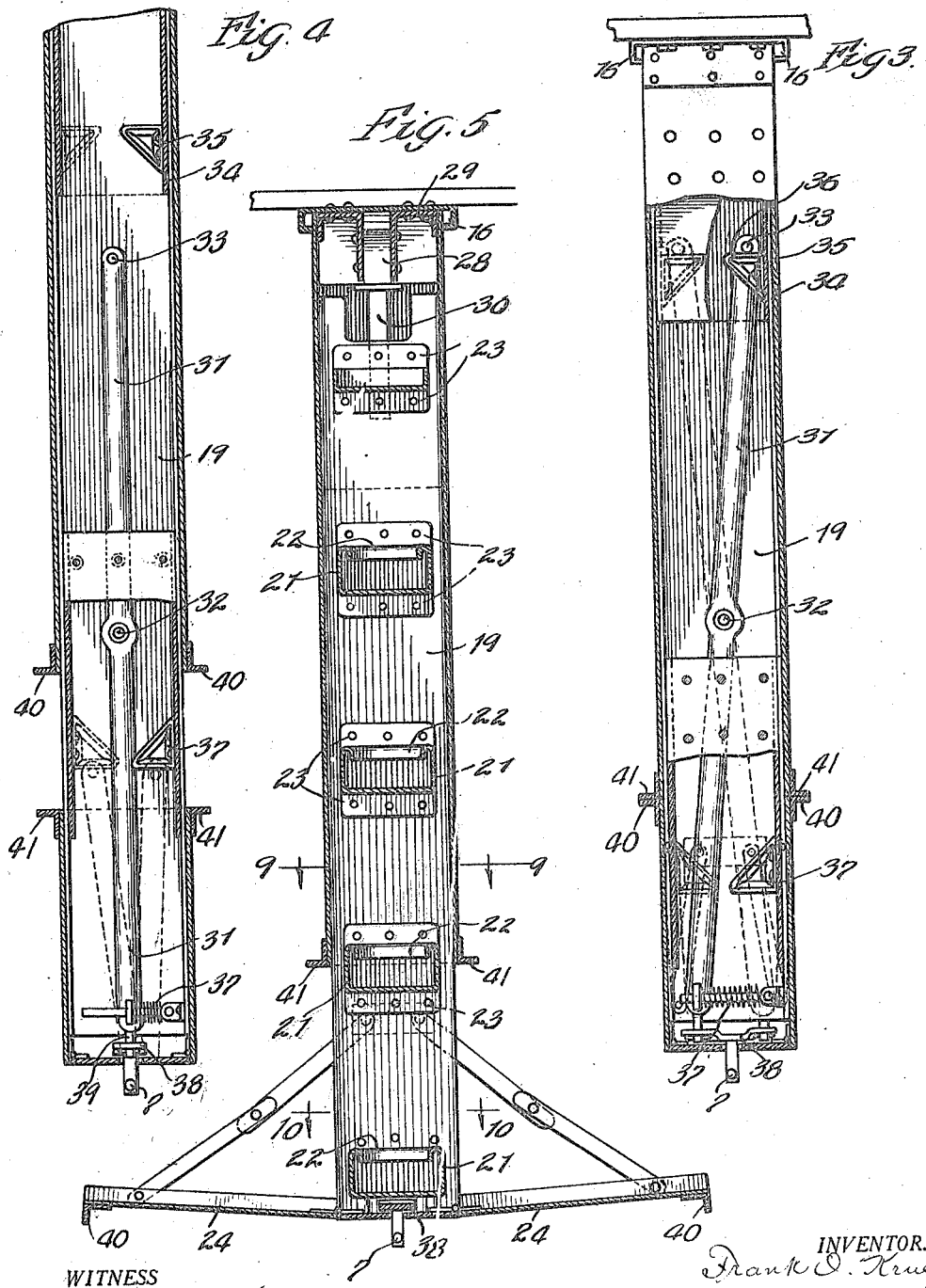

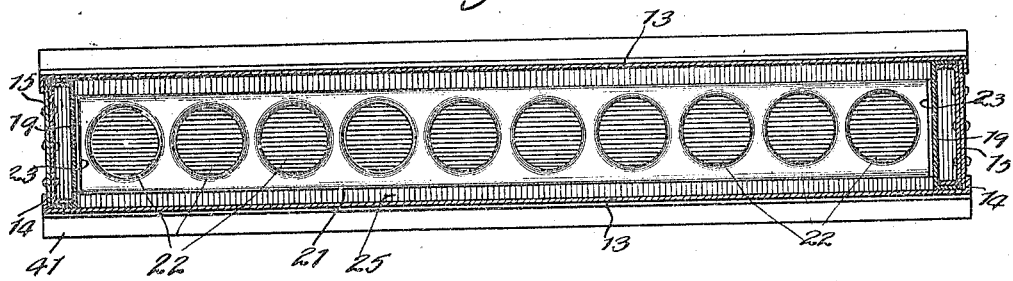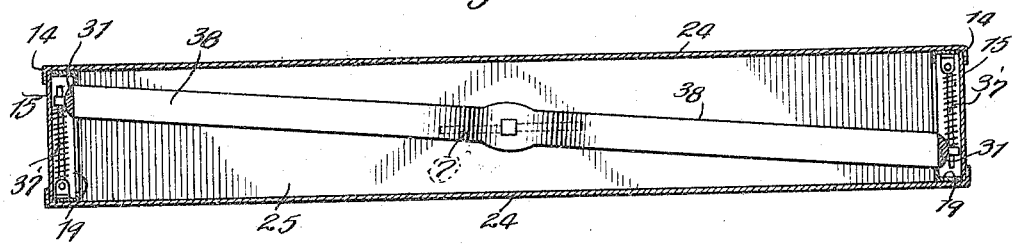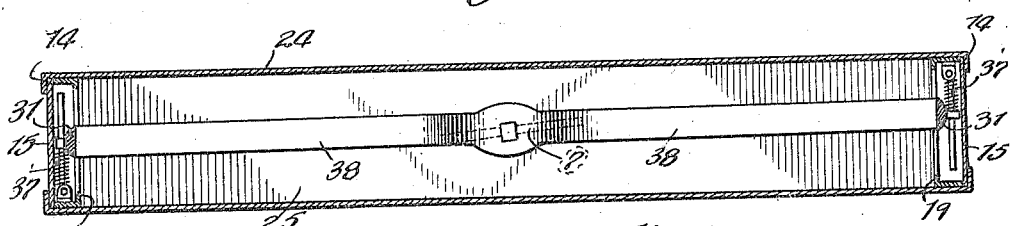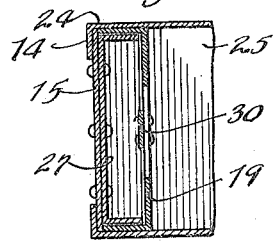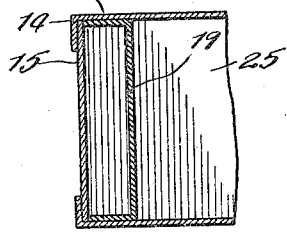

UNITED STATES PATENT OFFICE.

FRANK O. KRUEGER, OF LIMERIDGE, WISCONSIN.

MILK-BOTTLE CABINET.

1,257,495.  Specification of Letters Patent.  Patented Feb. 26, 1918.

Application filed January 2, 1917. Serial No. 140,180.

*To all whom it may concern:*

Be it known that I, FRANK O. KRUEGER, a citizen of the United States, residing at Limeridge, in the county of Sauk and State of Wisconsin, have invented new and useful Improvements in Milk-Bottle Cabinets, of which the following is a full, clear, concise, and exact description, reference being had to the accompanying drawing, forming a part of this specification.

My invention relates to milk bottle cabinets or storage devices, and particularly to a cabinet or storage device for use in creameries for holding the test bottles of the various collection routes of the creamery.

In large creameries it is the practice, when the collector returns from his route, to take samples of the milk from the different farms or dairies supplying milk to the creamery, placing the same in a bottle and keeping these samples for a predetermined length of time, adding thereto each day another sample, so that after the predetermined period a general average of the quality of the milk supplied may be arrived at and the proper basis for remuneration figured therefrom.

Heretofore, these sample bottles have been kept in open cabinets in the creamery, which are accessible to any person or persons entering the creamery. These open cabinets are not only insanitary, but they occupy considerable of the floor space of the creamery, and furthermore, unauthorized persons may obtain access to the same for the purpose of tampering with or adulterating the contents.

For the purpose of avoiding the various objections above noted, my cabinet has been particularly designed.

In order to disclose one embodiment thereof, I have illustrated the same in the accompanying drawings, in which—

Fig. 3 is a sectional view taken on the line 3—3 of Fig. 2;

Fig. 4 is a similar section showing the bottle receiver slightly lowered;

Fig. 5 is a sectional view taken on the line 5—5 of Fig. 2;

Fig. 6 is a sectional view taken on the line 6—6 of Fig. 2;

Fig. 7 is a sectional view taken on the line 7—7 of Fig. 2;

Fig. 8 is a similar sectional view showing the locking means in unlocked position;

Fig. 9 is a sectional view taken on the line 9—9 of Fig. 5; and

Fig. 10 is a sectional view taken on the line 10—10 of Fig. 5.

Figure 1:
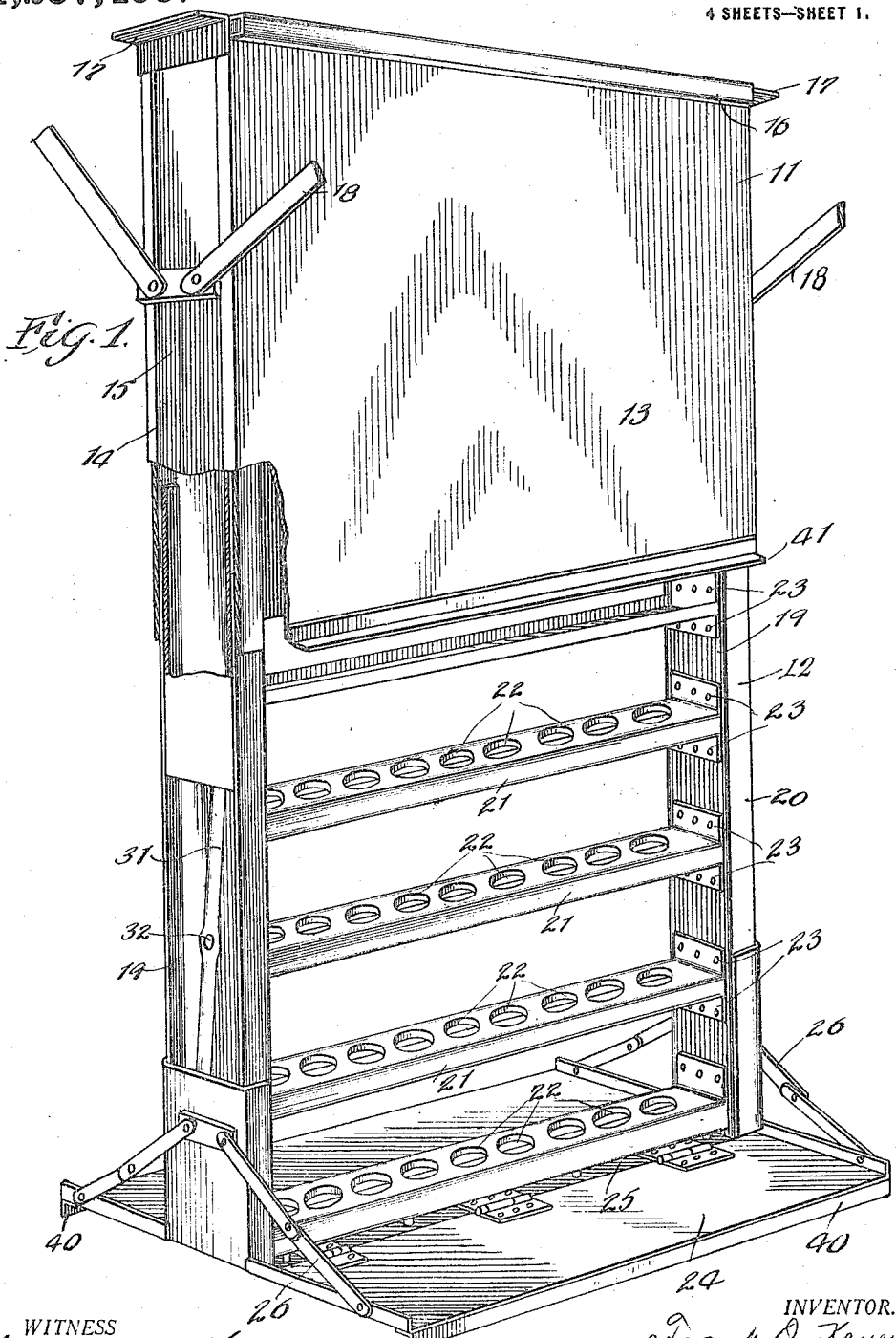
Figure 1 is a perspective view of my cabinet shown in open position, a part of the cabinet being broken away to show details.
Figure 2:
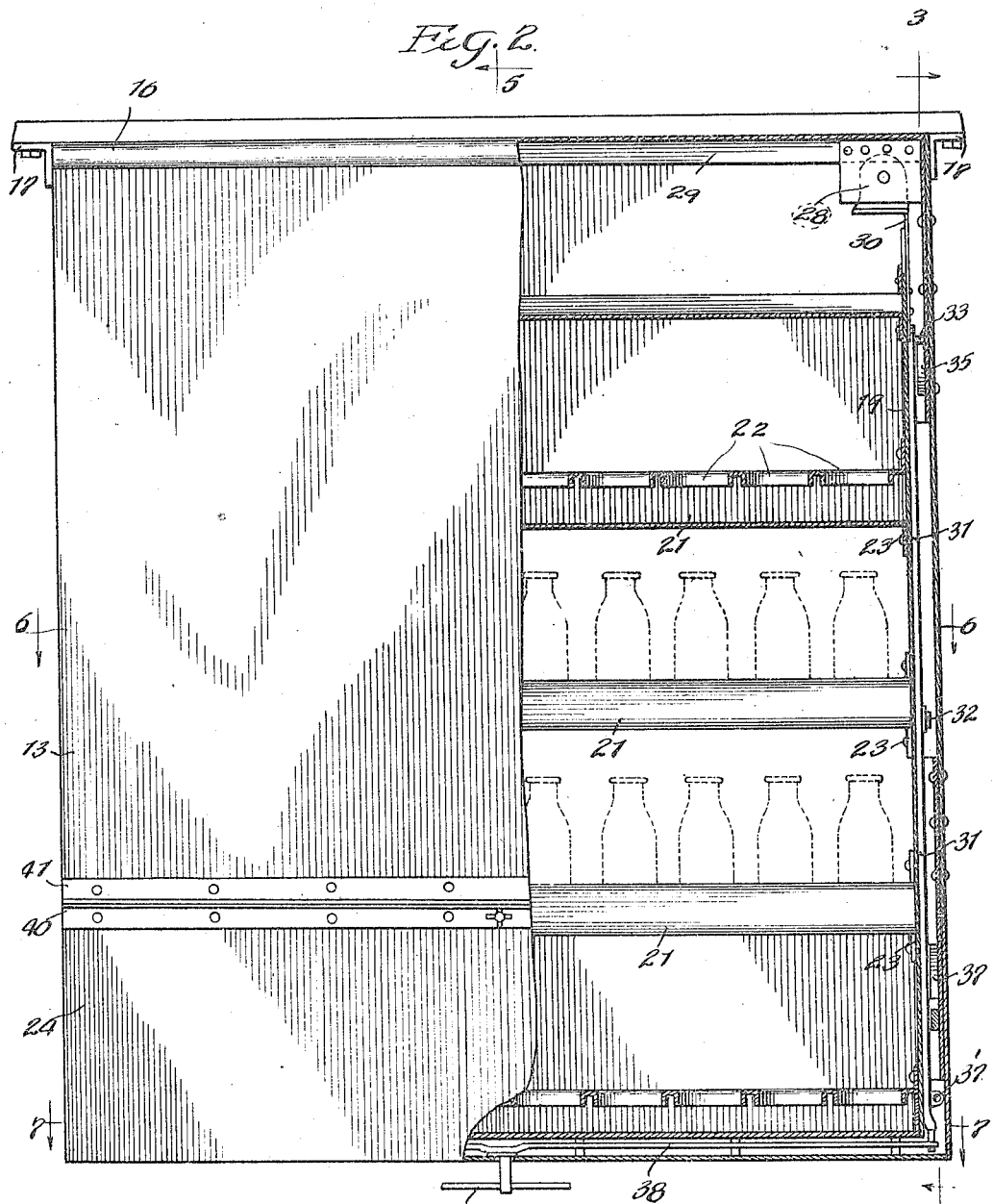
Fig. 2 is a front elevation of the cabinet in closed position, part of the side walls thereof being broken away for the purpose of disclosing details.

In the embodiment of the invention illustrated, the cabinet comprises a pair of telescoping members constituting the inclosing casing 11 and the bottle support 12. The inclosing casing is preferably formed of sheet metal and is formed from a pair of side panels 13 the ends of which are inturned, as at 14, to provide flanges against which the end panels 15 are secured. The upper portion of the inclosing member is suitably braced by means of channel irons 16 secured thereto, and is adapted to be supported from the ceiling by means of angle irons 17 bolted or otherwise secured to the ceiling of the room. This casing or inclosing member may also be side braced by means of side braces 18.

The bottle-supporting telescoping section 12 comprises a pair of side or frame members 19 which are preferably channeled to have the outturned flanges 20. Arranged between these side members are the bottle supports 21, comprising, as shown in Fig. 5, hollow rests having in their tops openings 22 to receive the bottles so that the same will be held against being jolted out of position, and being secured to the side members 19 by flanges 23 which are riveted to the side members. There may be any number of these bottle supports, but I have shown only four, considering this all that is necessary. The telescoping member 12 at its bottom is provided with a pair of hinged shelves or rests 24, which are hinged to the bottom brace 25 of the telescoping member, and provide shelves or rests upon which the route man may work in making up his report, also they provide shelves for transferring the contents from the cans to the bottles, etc. These shelves or rests are held by a link brace 26 at either end and are adapted to fold up when the telescoping member is slid into the casing member and close the lower part of the telescoping member.

As before stated, the telescoping member is formed of channel irons with their flanges 20 turned outwardly. These flanges slide in grooves shown particularly in Fig. 9 formed between the sides 13 and a guiding channel 27. This channel has its flat portion riveted to the side panels 15 and has its end flanges turned inwardly so that there is a guiding groove between this channel 27 and the sides of the casing in which the outturned flanges of the side channels 19 of the telescoping member operate and are guided. The channel 27 is not extended all the way up within the casing, but only extends a sufficient distance, as shown in Fig. 1, to provide a guiding means at the lower end of the casing. This channel also extends a slight distance down beyond the end of the side members 13 to brace and support the telescoping member when it is in its lowered position.

The telescoping member is supported from the top of the casing by means of spring drums 28 which are hung from an angle iron 29 secured on the under side of the top of the casing. Suitable ribbons 30, preferably of steel, are wound on these spring drums and have their ends connected to the top of the telescoping member so that the tendency of the spring drums to wind will assist in balancing the telescoping member to make the same rise and lower easily. To prevent the telescoping member from dropping when it is in its raised position under the weight of the bottles, or to prevent it from being raised when lowered by the spring drums 28, I provide a latching mechanism whereby the telescoping member may be locked in its closed or open position. This latching mechanism comprises a pair of longitudinally extended locking arms 31 which are centrally pivoted at 32 and at each end are provided with pins 33. Fastened to the inside of the casing are fixed latch members 34, it being remembered that there are two of the locking arms 31, one on each side of the sliding member. The latching members at the top are secured to the opposite side members of the casing so that the supporting strain will be evenly balanced. Each one of these latching members comprises a cam surface 35 and a lock surface 36. The locking arms 31 are held in their locking position by means of a coiled spring 37' at the bottom, which surrounds a suitable guide rod, so that when the telescoping member is raised the pins 33 on the locking arms 31 will ride over the cam surface 35 and as soon as the telescoping member has reached the uppermost limit of its movement the pin 33 will snap over or engage on the locking surface 36 of the member 34, thereby holding the telescoping member in raised position. Similar locking members 37 are secured at the bottom of the casing, except that their relative surfaces are reversed so that when the telescoping member is in lowered position it will be held therein by the lock. This lock is released both for the purpose of lowering and raising the telescoping member, by means of a handle 7 at the bottom of the telescoping member. This handle is secured to a pivoted rocking arm 38 which at its ends is provided with openings into which extensions 39 of the rocking members 31 fit.

The operation of the device is apparent. As shown in Fig. 1, the telescoping member is in its lowered position ready to receive the bottles. When the bottles have been placed therein the two side shelves 24 are closed up and the device released from its locked lowered position and shoved up into the casing. The flanges 40 on the shelves make a tight joint with the flanges 41 on the bottom of the side members 13, and the contents of the cabinet are completely inclosed and protected against dirt, dust and tampering.

Having thus described my invention, what I claim as new and desire to secure by Letters Patent is:—

1. A cabinet for milk bottles, comprising a casing open at the bottom, a vertically slidable frame movable through said opening and telescopically engaging said casing, means for supporting a plurality of bottles in said frame, and means for supporting said casing, and a combined shelf and closure member, mounted at the lower portion of said frame to swing from a horizontal position, in which it serves as a shelf, to a vertical position with its upper edge against the lower edge of the casing to form a closure.

2. A cabinet for milk bottles, comprising a casing open at the bottom, a vertically slidable frame movable through said opening and telescopically engaging said casing, means for supporting a plurality of bottles in said frame, means for supporting said casing, said frame comprising two vertical slides one at each end of the casing and a plurality of bottle racks extending between said slides, means for retaining said frame in extreme position, comprising a pair of locking members, one pivoted to each slide, a pair of fixed latch members, secured to the casing for coöperating with said locking members, respectively, and a member pivoted intermediate its ends and engaging said pivoted locking members for actuating them.

3. A cabinet for milk-bottles comprising a casing open at the bottom, a vertically-slidable frame movable through said opening and telescopically engaging said casing, comprising two vertical slides one at each end of the casing and a plurality of bottle-racks extending between said slides and secured thereto, and a shelf member pivotally mounted at the lower portion of said frame to swing about a horizontal axis from a horizontal position in which it serves as a shelf to a vertical position in which it lies compactly adjacent said slides.

4. A cabinet for milk-bottles comprising a casing substantially rectangular in horizontal cross-section and open at the bottom, a vertically-slidable frame movable through said opening and telescopically engaging said casing, comprising two vertical channeled slides one at each end of the casing, the flanges of said channels extending outwardly, whereby a space is provided between the channel and casing, bottle-shelves extending between said slides and secured thereto, and locking means for holding said frame in adjusted position, located in said space.

5. A cabinet for milk-bottles comprising a casing substantially rectangular in horizontal cross-section and open at the bottom, a vertically-slidable frame movable through said opening and telescopically engaging said casing, comprising two vertical channeled slides one at each end of the casing, the flanges of said channels extending outwardly, whereby a space is provided between the channel and casing, bottle-shelves extending between said slides and secured thereto, and locking means for holding said frame in adjusted position, located in said space and comprising a lever pivoted intermediate its ends and extending substantially vertically.

In witness whereof I have hereunto subscribed my name.

FRANK O. KRUEGER.

Witnesses:
  OTTO KRAUSE,
  MARY C. WITWEN.

Copies of this patent may be obtained for five cents each, by addressing the "Commissioner of Patents, Washington, D. C."